(12) United States Patent
Qin et al.

(10) Patent No.: US 7,493,674 B2
(45) Date of Patent: Feb. 24, 2009

(54) COVER RESTRICTING MECHANISM OF FOLDABLE ELECTRONIC DEVICE

(75) Inventors: Shui-Yuan Qin, Shenzhen (CN); Peng-Jin Ge, Shenzhen (CN); Rui-Hao Chen, Shenzhen (CN); Ye Liu, Shenzhen (CN); Hsiao-Hua Tu, Tu-cheng (TW); Chia-Hua Chen, Tu-cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 347 days.

(21) Appl. No.: 11/303,352

(22) Filed: Dec. 16, 2005

(65) Prior Publication Data

US 2006/0133796 A1 Jun. 22, 2006

(30) Foreign Application Priority Data

Dec. 17, 2004 (CN) .................... 2004201031140

(51) Int. Cl.
E05C 17/64 (2006.01)
(52) U.S. Cl. .......................... 16/328; 16/342
(58) Field of Classification Search ................ 16/342, 16/330, 303, 325–329, 374, 337, 296–297; 361/814, 680–683; 455/575.1, 575.4, 575.8, 455/550.1, 90.3; 348/373, 794, 333.06; 379/433.12, 379/433.13
See application file for complete search history.

(56) References Cited

U.S. PATENT DOCUMENTS

| | | | | | |
|---|---|---|---|---|---|
| 3,460,190 | A | * | 8/1969 | MacDonald | 16/303 |
| 3,550,186 | A | * | 12/1970 | Swartz | 16/278 |
| 4,424,606 | A | * | 1/1984 | Sorimachi | 16/223 |
| 5,185,790 | A | * | 2/1993 | Mischneko | 379/433.13 |
| 5,274,882 | A | * | 1/1994 | Persson | 16/303 |
| 5,678,206 | A | * | 10/1997 | Ishii | 455/575.8 |
| 5,813,093 | A | * | 9/1998 | Giordano, Jr. et al. | 16/329 |
| 6,125,509 | A | * | 10/2000 | Hartigan et al. | 16/337 |
| 6,456,365 | B1 | * | 9/2002 | Hosaka et al. | 355/75 |
| 6,609,273 | B1 | * | 8/2003 | Yamada et al. | 16/332 |
| 2004/0244147 | A1 | * | 12/2004 | Qin et al. | 16/330 |

* cited by examiner

Primary Examiner—Chuck Y. Mah
(74) Attorney, Agent, or Firm—Steven M. Reiss

(57) ABSTRACT

A cover restricting mechanism (8) is adapted for use in a foldable electronic device (9). The foldable electronic device includes a cover (10). The cover restricting mechanism includes a follower (31), a housing (20), and a restricting mechanism (32). The follower is provided at one end of the cover. The housing has a cavity (21). The restricting mechanism is provided in the cavity of the housing, and when the cover is rotated to an open position, the follower rotates with the cover, and the restricting mechanism retards/slows the progress of the follower, thereby helping the cover to come more gently to a full, open position.

12 Claims, 5 Drawing Sheets

COVER RESTRICTING MECHANISM OF FOLDABLE ELECTRONIC DEVICE

BACKGROUND OF THE INVENTION

1. Field of the Invention

The present invention generally relates to cover restricting mechanisms and, more particularly, to a cover restricting mechanism for a foldable electronic device such as a mobile telephone, an electronic notebook, and so on.

2. Discussion of the Related Art

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly welcome by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size, and weight of such foldable electronic devices. Also, it is desirable for the hinge assembly coupling the body with the cover to have a long working lifetime.

A modularized hinge assembly is generally used to hinge together a cover of a foldable electronic device and a body of the foldable electronic device. The hinge assembly typically includes moving parts such as a cam member having a cam surface, a cam follower having a cam follower surface, a spring, a shaft, and a housing. The cam member, the cam follower, and the spring are placed around the shaft and then received in the housing, thereby being held together in a unified structure. The housing is secured to the body, and the cam member engages with the cover. The cam member and the cam follower always contact each other by engagement of the cam and follower surfaces and due to the action of the spring. When opening the cover, the cover is rotated by hand, which makes the cam member rotate along with the cover. At the same time, the cam member urges against the cam follower, making the cam follower move along the shaft and compress the spring. When the cam member rides over a convex portion of the cam follower, the cover is opened to a predetermined angle. Releasing the cover, the cam follower urges against the cam member, under the force of the spring, and makes the cam member continuously rotate, thus making the cover open fully.

In the above-described hinge assembly, when the cover is opened to a predetermined angle, the cover rotates to a predetermined position. This rotation occurs due to the engaging relationship of the cam follower and the cam member, such engagement being maintained under the force of the spring. However, the abrupt force of the spring of the hinge assembly has a large impact on the cover, which may damage the cover and/or decrease the working lifetime of the cover. Such a negative influence on the operation of the cover would expectedly reduce the working lifetime of the foldable electronic device, overall. In addition, many foldable electronic devices need to be opened to other positions such as 150° or 160° positions. This angle requirement means that the body of the foldable electronic device itself needs to be specially designed in order to limit the maximum opening angle of the cover. This designing takes up valuable "real estate" on the body, increases the complexity of the manufacture of the body, and increases the overall volume and weight of the mobile phone. Furthermore, each time the cover is opened, it impacts the body. The body is liable to become worn or damaged due to such impact, thereby shortening the working lifetime of the mobile phone.

What is needed, therefore is to provide a cover restricting mechanism that overcomes the above-described problems.

SUMMARY OF THE INVENTION

A cover restricting mechanism is adapted/configured for use in a foldable electronic device. The foldable electronic device includes a cover and the cover restricting mechanism. The cover restricting mechanism includes a follower, a housing, and a restricting mechanism. The follower is provided at one end of the cover. The housing has a cavity defining an inner surface of the housing. The restricting mechanism is provided at and against the inner surface of the housing. The restricting mechanism is adapted/configured for rotatably receiving the follower therein. The restricting mechanism is particularly configured such that, when the cover is rotated to an open position, the follower rotates with the cover, and the restricting mechanism retards or restricts the follower and, thus, the cover.

When the cover restricting mechanism is installed in the foldable electronic device, opening and closing the cover is easy. When the user manually rotates the cover to a predetermined angle toward an open position, the restricting mechanism can reduce impact of the cover as a result of the abrupt force generated by a spring of a hinge assembly installed in the foldable electronic device. Also, the restricting mechanism can reduce the vibration/shaking of the cover. In addition, the structure of the cover restricting mechanism is simple and thus should not increase the volume of the foldable electronic device much at all, if any.

Other advantages and novel features of the preferred embodiment will become more apparent from the following detailed description thereof when taken in conjunction with the accompanying drawings.

BRIEF DESCRIPTION OF THE DRAWINGS

Many aspects of the present cover restricting mechanism can be better understood with reference to the following drawings. The components in the drawings are not necessarily to scale, the emphasis instead being placed upon clearly illustrating the principles of the present cover restricting mechanism and its potential applications. Moreover, in the drawings, like reference numerals designate corresponding parts throughout the several views.

DETAILED DESCRIPTION OF PREFERRED EMBODIMENTS

Figure 1:
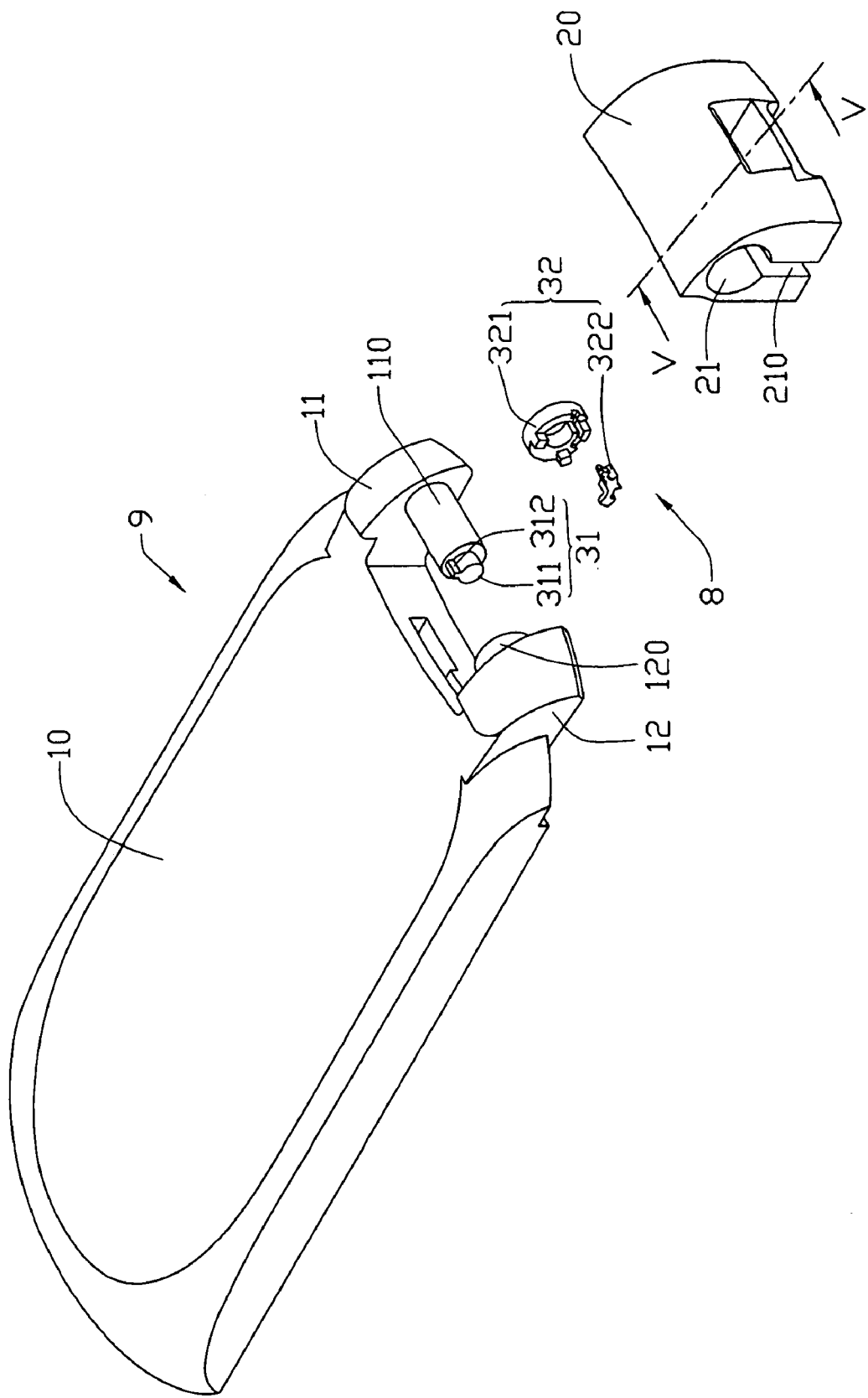
FIG. 1 is an exploded, isometric view of the cover restricting mechanism, incorporated in a foldable electronic device, in accordance with a preferred embodiment.

Referring now to the drawings, FIG. 1 shows a cover restricting mechanism 8 according to a preferred embodiment of the present mechanism. The cover restricting mechanism 8 is adapted for use in a foldable electronic device 9.

The foldable electronic device 9 includes a body (not shown), a cover 10, a housing 20, and a hinge assembly (not shown). The housing 20 is formed at or otherwise attached to one end of the body. The hinge assembly is contained in the housing 20 and is used to hinge the body and the cover 10 together. The hinge assembly can be any kind of hinge assembly, the hinge assembly generally, for example, including a shaft, a cover driven member, a body driven member, and a spring.

Figure 5:
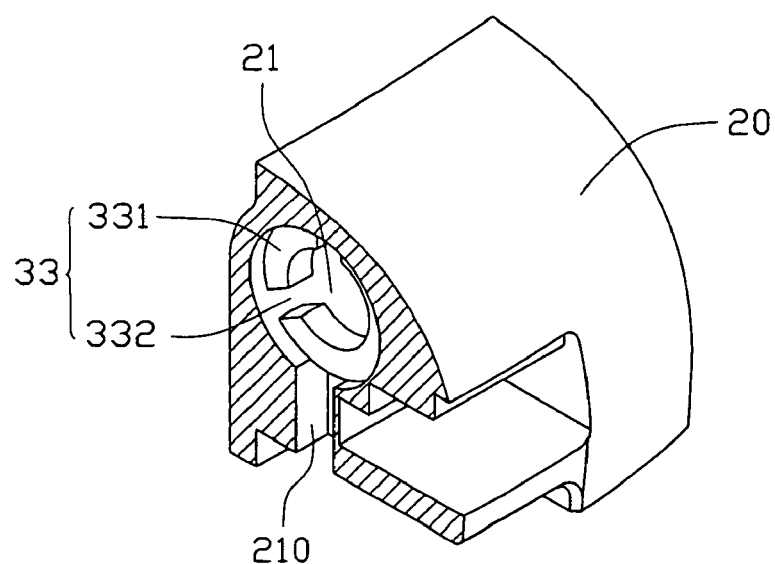
FIG. 5 is a cross-sectional view of a housing of the cover restricting mechanism along line V-V of FIG. 1.

The cover restricting mechanism 8 includes the housing 20, a follower 31, a restricting mechanism 32, and a positioning portion 33, also referring to FIG. 5. The follower 31 is provided at one end of the cover 10. The restricting mechanism 32 and the positioning portion 33 are provided in the housing 20.

The cover 10 includes a first support portion 11 and a second support portion 12, each of which is formed at a same end of the cover 10 and at sides opposite to each other. A first column portion 110 and a barrel portion 120 respectively extend from the first support portion 11 and the second support portion 12, and such portions 110, 120 face one another. The barrel portion 120 is substantially in the form of a hollow cylinder. The follower 31 extends from a projecting end of the first column portion 110 and includes a second column portion 311 and a follower projection 312. The second column portion 311 joins the first column portion 110 and is arranged coaxially with the first column portion 110. The follower projection 312 is provided on an outer (i.e., peripheral) surface of the second column portion 311.

The housing 20 is substantially in the form of a hollow quarter-cylinder, and the housing has a center cavity 21 and a channel 210. The center cavity 21 is defined through a center portion of the housing 20 along a center axis thereof The channel 210 is formed in a wall of the housing 20 along a center axis thereof, and this channel 210 communicates with the center cavity 21 of the housing 20. The surfaces associated with the center cavity 21 and the channel 210 together effectively define the inner surface of the housing 20, as a whole. Referring also to FIG. 5, the positioning portion 33, which is integral with the inner surface of the housing 20 in the center cavity 21 in the illustrated embodiment, includes an annular protrusion or projection 331 and two receiving holes or slots 332. The annular protrusion 331 extends from an inner surface of the housing 20 in a radial direction. The receiving holes 332 are defined through the annular protrusion 331 along an axial direction thereof. The receiving holes 332 communicate with the center cavity 21 of the housing 20. It is to be understood that positioning portion 33 could instead be manufactured as a separate unit, made of one or more pieces, and be configured for insertion into the center cavity 21, and such a unit would be within the scope of the present foldable electronic device 9.

Figure 2:
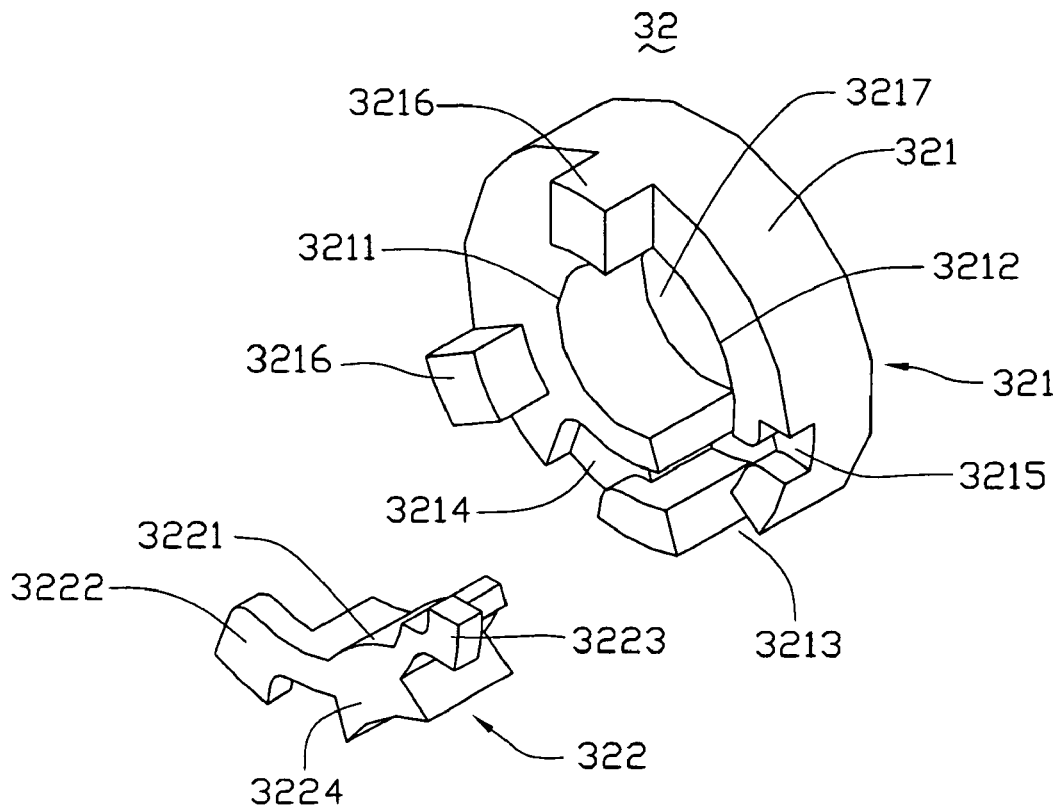
FIG. 2 is an exploded, enlarged view of a restricting mechanism of the cover restricting mechanism of FIG. 1.
Figure 3:
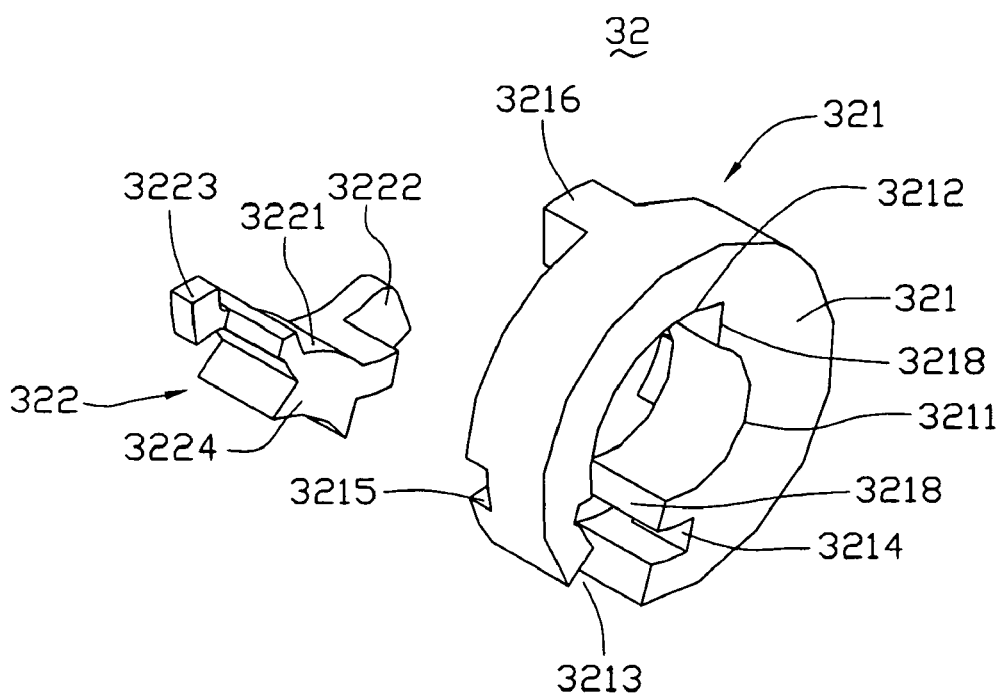
FIG. 3 is similar to FIG. 2 but viewed from another aspect.
Figure 4:
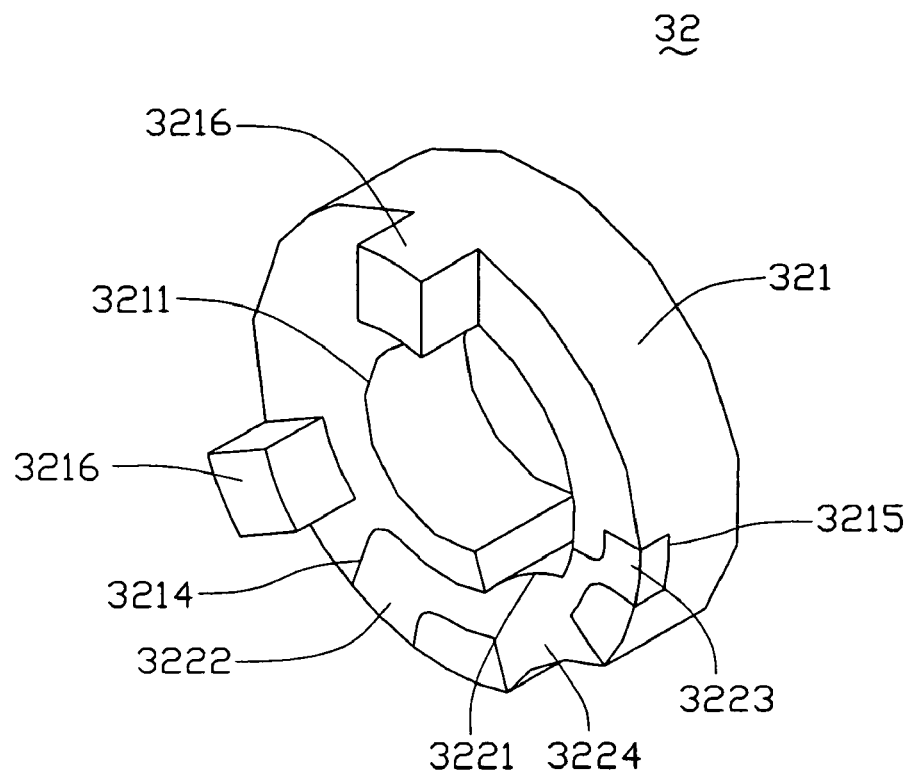
FIG. 4 is an assembled view of the restricting mechanism of the cover restricting mechanism of FIG. 3.

Also referring to FIGS. 2-4, the restricting mechanism 32 includes a receiving element 321 and a damping element 322. The receiving element 321 is substantially a circular wall and defines a first arc inner face 3211 and a second arc inner face 3212 through a center thereof along a center axis. The first arc inner face 3211 and the second arc inner face 3212 are opposite to each other and join with each other to help define an arc-faced through hole 3217. A diameter of the first arc inner face 3211 is equal to a diameter of the second column portion 311. A semi-diameter of the second arc inner face 3212 is a sum of a semi-diameter of the second column portion 311 and a height of the follower projection 312. The receiving element 321 further includes a pair of stop faces 3218, extending respectively from opposing ends of the first arc inner face 3211 toward the second arc inner face 3212. Such stop faces 3218 act as stop limits for the angular motion range of the follower projection 312 and, thus, the cover 10. The receiving element 321 further has a wall opening 3213, a first receiving channel 3214, and a second receiving channel 3215 defined therein. The arc-faced through hole 3217, the wall opening 3213, the first receiving channel 3214, and the second receiving channel 3215 communicate with one another. The first receiving channel 3214 and the second receiving channel 3215 are opposite to each other. Two protrusions 3216 are provided at one end of the receiving element 321. The two protrusions 3216 are engaged with the receiving holes 332 of the positioning portion 33.

The damping element 322 is shaped for reception in the wall opening 3213, the first receiving channel 3214, and the second receiving channel 3215 and is made of elastic rubber or another suitably elastic material. The damping element 322 includes a central damping section 3224, a first arm 3222, and a second arm 3223. The central damping section 3224 is a generally convex-concave member and includes a convex arc protrusion 3221 arranged so as to face toward the arc-faced through hole 3217. The shape, arrangement, and material make-up of the central damping section 3224 allow it act like a spring and thereby absorb shock/force. As such, the damping element 321 helps promote a long working lifetime for the restricting element 32. The convex arc protrusion 3221, upon assembly, is configured to interact with the follower projection 312 during opening of the cover 10. Specifically, the convex arc protrusion 3221 absorbs a portion of the force placed upon the follower projection 312 by the hinge assembly during opening, thus slowing its travel and, accordingly, that of the cover 10. The first arm 3222 and the second arm 3223 extend from two opposite sides of the central damping section 3224, respectively. The first arm 3222 is engaged with the first receiving channel 3214 of the receiving element 321. The second arm 3223 is engaged with the second receiving channel 3215 of the receiving element 321. The central damping section 3224 is engaged with the opening 3213 of the receiving element 321.

Figure 6:
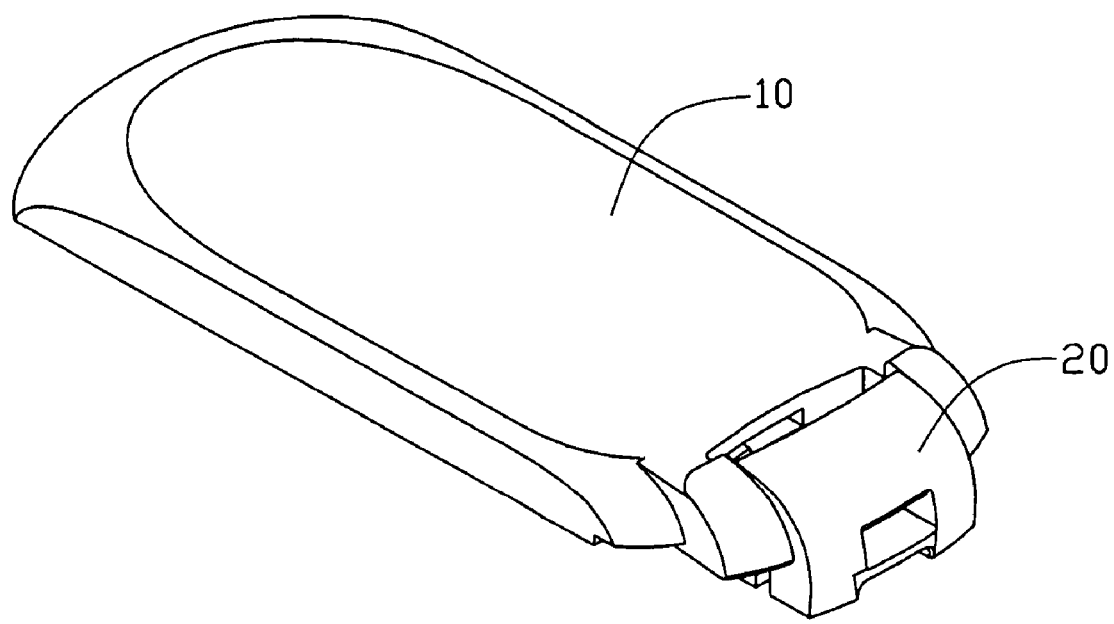
FIG. 6 is an isometric view of a cover incorporating the cover restricting mechanism.

In assembly, the damping element 322 of the restricting mechanism 32 is assembled with the receiving element 321. The first arm 3222, central damping section 3224, and second arm 3223 are engaged, respectively, with the first receiving channel 3214, the opening 3213, and the second receiving channel 3215. The assembled restricting mechanism 32 is inserted into the center cavity 21 of the housing 20 with the protrusions 3216 of the restricting mechanism 32 respectively engaging with the receiving holes 332 of the positioning portion 33, which extends from an inner surface of the housing 20 in a radial direction. The hinge assembly is inserted into the center cavity 21 of the housing 20. The housing 20 is mounted to the end of the cover 10. The barrel portion 120 of the cover 10 is received in one end of the housing 20, and the column portion 110 of the cover 10 is received in an opposite end of the housing 20, as represented in FIG. 6. Wires may connect circuits in the cover 10 and circuits in the body by means of the channel 210 of the housing 20.

Figure 7:
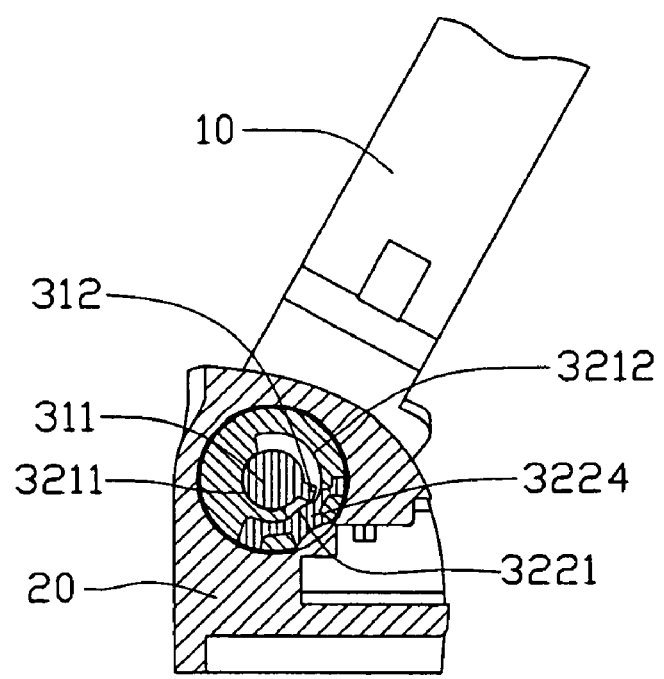
FIG. 7 is a partial cross-sectional view of the cover restricting mechanism, corresponding to a partly open position of the foldable electronic device.
Figure 8:
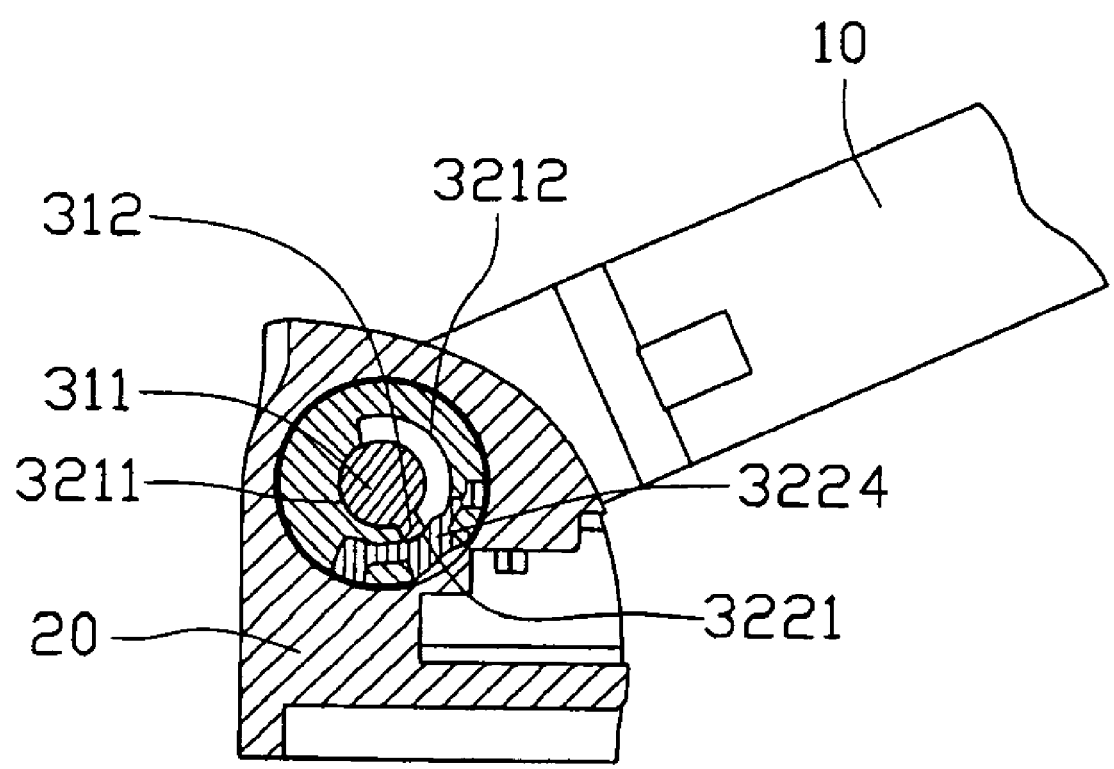
FIG. 8 is similar to FIG. 7, but showing the cover restricting mechanism corresponding to an open position of the foldable electronic device.

Referring to FIGS. 7-8, in use, when a user wants to open the cover 10, he/she may manually rotate the cover 10 up to an open position. The follower projection 312 rotates with the cover 10. When the cover 10 is opened to a predetermined angle, the cover 10 is opened automatically under the force of the spring of the hinge assembly because of the release of the spring. When the follower projection 312 contacts the arc protrusion 3221 of the restricting mechanism 32, the arc protrusion 3221 is compressed and produces a resilient force. The moving rate of the cover 10 is thereby retarded/slowed down by the resilient force produced by the arc protrusion 3221. Then, the cover 10 continuously rotates to a fully open position at a very low rate, thus lowering the impact experienced by the cover 10 upon reaching the full-open position.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover restricting mechanism for a foldable electronic device, the foldable electronic device including a cover, the cover restricting mechanism comprising:
   a follower including a column portion provided at one end of the cover and a follower projection provided on the column portion;
   a housing having an inner surface, the inner surface defining a cavity within the housing; and
   a restricting mechanism provided within the cavity of the housing, the restricting mechanism including a receiving element, the receiving element defining a first arc inner face and a second arc inner face through a center thereof, the first arc inner face and the second arc inner face being opposite to each other, the first arc inner face being configured for rotatably receiving the column portion, the second arc inner face being configured for rotatably receiving the follower projection, the restricting mechanism being configured such that, when the follower is rotated in an opening direction, the restricting mechanism retards the progression of the follower.

2. The cover restricting mechanism as claimed in claim 1, wherein the cover includes a first support portion and a second support portion, and the two support portions are provided at an end of the cover.

3. The cover restricting mechanism as claimed in claim 2, wherein the follower projection is provided on an outer surface of the column portion.

4. The cover restricting mechanism as claimed in claim 1, further comprising a positioning portion, the positioning portion being provided at an inner surface of the housing, the positioning portion being configured for positioning the restricting mechanism.

5. The cover restricting mechanism as claimed in claim 4, wherein the positioning portion includes an annular projection and a receiving hole, the annular projection extends from the inner surface of the housing in a radial direction, and the receiving hole is defined through the annular projection along an axial direction thereof.

6. The cover restricting mechanism as claimed in claim 5, wherein a protrusion is provided at an end of the restricting mechanism, and the restricting mechanism is received in the cavity of the housing with the protrusion engaging in the receiving hole of the positioning portion.

7. The cover restricting mechanism as claimed in claim 1, wherein the restricting mechanism includes a damping element, the damping element including an arc protrusion, the damping element is received in the receiving element.

8. The cover restricting mechanism as claimed in claim 7, wherein the receiving element comprises a circular wall and defines an opening and two receiving channels, and the opening and the two receiving channels communicate with each other.

9. The cover restricting mechanism as claimed in claim 8, wherein the damping element is comprised of a central damping section and two arms, the two arms respectively extending from two opposite side of the central damping section, the two arms being respectively engaged with the corresponding receiving channels of the receiving element, and the damping element being engaged with the opening of the receiving element.

10. A foldable electronic device comprising:
    a cover;
    a follower including a column portion provided at one end of the cover and a follower projection provided on the column portion, the follower being rotatable with the cover;
    a housing having an inner surface, the inner surface defining a cavity within the housing; and
    a restricting mechanism provided within the cavity of the housing, the restricting mechanism including a receiving element, the receiving element defining a first arc inner face and a second arc inner face through a center thereof, the first arc inner face and the second arc inner face being opposite to each other, the first arc inner face being configured for rotatably receiving the column portion, the second arc inner face being configured for rotatably receiving the follower projection, the restricting mechanism being configured such that, when the cover and the follower are rotated in an opening direction, the restricting mechanism retards the progression of the follower and, thus, the cover.

11. The foldable electronic device as claimed in claim 10, wherein the housing further includes a positioning portion provided at an inner surface thereof and configured for positioning the restricting mechanism, the positioning portion includes an annular projection and a receiving hole, the annular projection extends from the inner surface of the housing in a radial direction, the receiving hole is defined through the annular projection along an axial direction thereof, a protrusion is provided at an end of the restricting mechanism, and the restricting mechanism is received in the cavity of the housing with the protrusion engaging in the receiving hole of the positioning portion.

12. The foldable electronic device as claimed in claim 10, wherein the restricting mechanism includes a damping element, the receiving element includes a circular wall and defines an opening and two receiving channels, the opening and the two receiving channels communicate with each other, the damping element includes a central damping section, two arms and an arc protrusion, the two arms respectively extend from two opposite side of the central damping section, the two arms are respectively engaged with the corresponding receiving channels of the receiving element, and the damping element is engaged with the opening of the receiving element.

* * * * *